United States Patent
Kempf

(10) Patent No.: US 7,368,826 B2
(45) Date of Patent: May 6, 2008

(54) ELECTRO-HYDRAULIC UNIT, IN PARTICULAR FOR ANTI-LOCK DEVICES FOR AUTOMOTIVE VEHICLE WHEELS

(75) Inventor: Christian Kempf, Toulouse (FR)

(73) Assignee: Siemens VDO Automotive, Toulouse Cedex (FR)

( * ) Notice: Subject to any disclaimer, the term of this patent is extended or adjusted under 35 U.S.C. 154(b) by 91 days.

(21) Appl. No.: 10/589,008

(22) PCT Filed: Jan. 21, 2005

(86) PCT No.: PCT/EP2005/000584

§ 371 (c)(1),
(2), (4) Date: Aug. 10, 2006

(87) PCT Pub. No.: WO2005/087564

PCT Pub. Date: Sep. 22, 2005

(65) Prior Publication Data

US 2007/0090689 A1    Apr. 26, 2007

(30) Foreign Application Priority Data

Feb. 10, 2004 (FR) .................................. 04 01256

(51) Int. Cl.
*H02K 5/00* (2006.01)
*H02P 9/04* (2006.01)

(52) U.S. Cl. ........................... 290/1 R; 290/39; 310/89
(58) Field of Classification Search ................ 290/1 R, 290/6, 7, 39, 49; 310/89, 90, 91
See application file for complete search history.

(56) References Cited

U.S. PATENT DOCUMENTS

| | | | | |
|---|---|---|---|---|
| 3,683,219 A * | 8/1972 | Kruse et al. | ................ | 310/168 |
| 5,164,625 A * | 11/1992 | Hofmann et al. | ............. | 310/88 |
| 5,281,013 A | 1/1994 | Pichon et al. | | |
| 5,576,586 A * | 11/1996 | Blumenberg | ................ | 310/88 |
| 5,688,028 A | 11/1997 | Kohno et al. | | |
| 5,854,522 A * | 12/1998 | Iwata et al. | ................... | 310/89 |
| 5,975,860 A * | 11/1999 | Obayashi et al. | ........... | 417/223 |
| 6,182,350 B1 * | 2/2001 | Iwata et al. | ................... | 29/598 |
| 6,196,813 B1 * | 3/2001 | Turley et al. | .......... | 417/423.12 |
| 7,056,100 B2 * | 6/2006 | Schwarzkopf et al. | ...... | 417/269 |

FOREIGN PATENT DOCUMENTS

| | | |
|---|---|---|
| EP | 0 645 875 | 3/1995 |
| EP | 0 769 437 | 4/1997 |
| FR | 2 710 699 | 4/1995 |

* cited by examiner

*Primary Examiner*—Nicholas Ponomarenko
(74) *Attorney, Agent, or Firm*—Young & Thompson

(57) ABSTRACT

An electro-hydraulic unit (10) in particular for an automotive vehicle anti-locking wheel device, includes two separate parts:
  an electronic control (13) within which is located particularly an electronic card (14), winding (17) as well as an electric motor (15) provided with a rotor and a stator, the motor being adapted to drive a pump, and
  a hydraulic unit (11), including the pump and a plurality of valves (12), the whole electronically directed by the control (13),
the electro-hydraulic unit being characterized in that it further includes a ferromagnetic circuit (22) common at least partially to the stator and to the winding (17).

6 Claims, 2 Drawing Sheets

ELECTRO-HYDRAULIC UNIT, IN PARTICULAR FOR ANTI-LOCK DEVICES FOR AUTOMOTIVE VEHICLE WHEELS

FIELD OF THE INVENTION

The present invention relates to an electro-hydraulic unit, and more particularly to such a unit used in an anti-lock device for the wheels of an automotive vehicle.

The electro-hydraulic units used in wheel anti-lock systems are conventionally constituted by three separate parts:
an electric motor, which drives a pump,
a hydraulic block, which comprises the pump and a certain number of valves, pressure detectors, and
an electronic control comprising among other things an electronic card and winding each controlling a valve. The assembly formed by one winding and its valve is called an electrovalve.

BACKGROUND OF THE INVENTION

An example of a unit of this type is described in EP 0 645 875.

Among the conditions which must be satisfied by these electro-hydraulic units, can be cited minimum size, sealing against external moisture and the cost of production.

The present invention has principally for its object to propose an electro-hydraulic unit whose size is substantially less than known units of the prior art.

It is for example already known, from FR 2 710 699, to position the electric motor and the electronic control in a same and single housing. However, the housing thus made has even greater size, because each portion is juxtaposed or inserted in another but retains all the same assembly of the usual components.

There is also known from EP 0 769 437 an electro-hydraulic unit in which, to reduce the number of parts, there is provided a ferrocircuit common to the winding (of the electrovalves) and to the stator (of the motor). However, this ferrocircuit is made by assembly on the one hand of the rear portion of the cover of the motor and on the other hand by the hydraulic block itself. It is thus a matter of a common ferrocircuit but made in two separate parts. According to this document, the hydraulic block is at least magnetizable as to its winding. However, it is not disclosed how to render magnetizable the hydraulic block.

In fact, two solutions are possible to have a magnetized hydraulic block: either the block is made of iron, or magnetic elements are added to it. The production of a hydraulic block of iron is unthinkable without substantial increase of cost. Thus, such a block is too long and too costly to machine. This is moreover the reason for which the hydraulic blocks known at present are made exclusively of aluminum. Aluminum is thus a metal which can be easily machined and above all rapidly, with conventional tools. However, given the shape and complexity of present hydraulic blocks, it is not conceivable to make them by molding.

On the other hand, it is much too costly to add either a magnetic material or a magnetic element inserted in an aluminum hydraulic block to render it magnetic. These techniques are too troublesome.

SUMMARY OF THE INVENTION

The object of the present invention is thus to reduce the size of the electro-hydraulic unit, particularly by using common constituents without modifying the hydraulic block.

To this end, the present invention relates to an electro-hydraulic unit in particular for automotive vehicle wheel anti-lock devices, said electro-hydraulic unit being of the type comprising two separate parts:
an electronic control within which is located particularly an electronic card, winding as well as an electric motor provided with a rotor and a stator, said motor being adapted to drive a pump, and
a hydraulic unit, comprising the pump and a plurality of valves, the whole electronically directed by the control, the said electro-hydraulic unit comprising moreover:
a magnetic circuit common at least partially to the stator and the winding, said unit being characterized in that the ferrocircuit is independent of the hydraulic unit and has at its periphery an annular flange housing the winding, said annular flange ensuring simultaneously a function of mechanically holding the winding and a function of magnetic conduction for these winding.

Thanks to this arrangement, not only is it possible to integrate the motor into the control, but it is moreover possible to use in common certain components belonging to the ferrocircuit (magnetic circuit) and because of this the number of pieces comprising the electro-hydraulic unit is reduced, without modifying corresponding the hydraulic unit (already sufficiently complex and ponderous in itself). The size of this unit is also reduced.

According to an important aspect of the invention, the ferrocircuit ensures a function of magnetic conduction both for the stator and for the winding.

Surprisingly, it has been observed that there is no or little magnetic diaphony between the stator and the winding. More exactly, the motor controls do not disturb the electrovalve controls (constituted by the assembly of the winding of their metallic frames and a valve secured to the hydraulic block) and vice versa. Moreover, the same is true for diaphony between the electrovalves, which does not exist when these latter are simultaneously controlled.

Preferably, the ferrocircuit has at its periphery an annular flange permitting enclosing the magnetic field produced by the winding on the active portion of the valve. Thus, the electrovalves are disposed as close as possible to the motor block, which permits decreasing the size of the electro-hydraulic unit. It will be noted that the ferrocircuit ensures simultaneously a function of mechanically holding the winding at a function of magnetic conduction for these winding.

Preferably, it is possible to arrange the electrovalves (winding+valve+ferrocircuit) at the periphery of the motor, which reduces at least the axial size of the electro-hydraulic unit.

Preferably, the ferrocircuit is a part that is easy to make from a metallic plate forming a stator and having an annular flange at its external periphery. It is however necessary to consider that this part can be made by other processes than stamping. For example, a machining process permitting producing all the magnetic circuit in a single part is also envisageable. Such a machining (or fritting) also permits positioning the annular flange suitably whilst offering moreover possibilities of adaptation for winding or motors of different sizes.

Preferably, the motor has a collector (called external collector) positioned in the housing opposite that the hydraulic block, which permits particularly reducing the length of the electrical connections between the electronic card and the brushes. Moreover, such a motor with external collector has the possibility of supporting the brushes directly by the housing or by the electronic card; this was not the case previously and required the use of an intermediate plastic part called a brush carrying plate.

The ferrocircuit, according to the invention, being made from a single metallic part, may preferably be provided with suitable joints to ensure sealing between the hydraulic unit and the control.

BRIEF DESCRIPTION OF THE DRAWINGS

Other objects, characteristics and advantages of the present invention will become apparent from the description which follows, by way of non-limiting example, with reference to the accompanying drawings, in which.

DETAILED DESCRIPTION OF THE INVENTION

Figure 1:
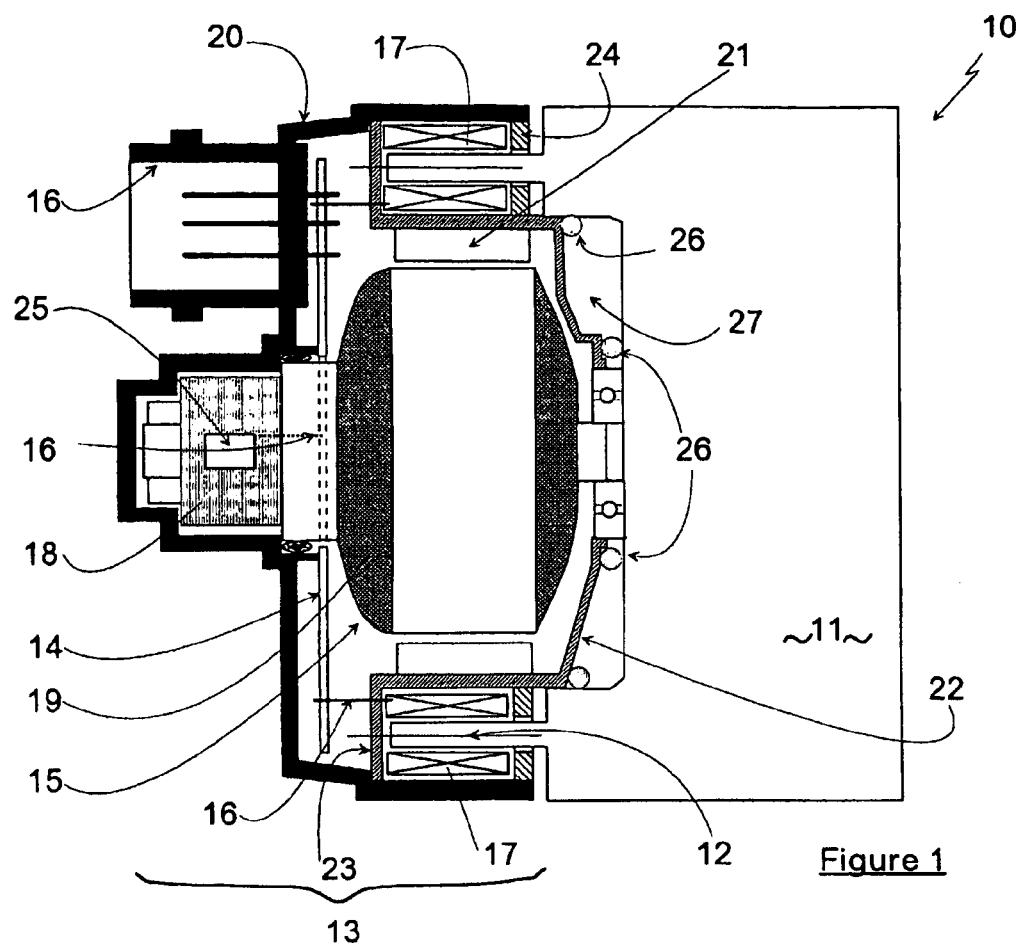
FIG. 1 is a schematic cross-sectional view, showing the electro-hydraulic unit according to the invention.
Figure 2:
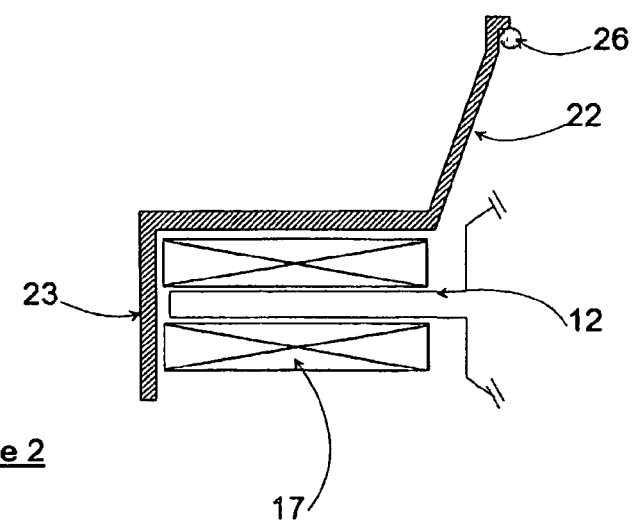
FIG. 2 is a schematic cross-sectional view of the magnetic circuit (ferrocircuit) according to the invention.

According to the embodiment shown in FIGS. 1 and 2, the electro-hydraulic unit 10 according to the invention comprises two parts, namely:

a hydraulic unit 11 comprising a pump (not shown) and a plurality of valves 12, and an electronic control 13 comprising particularly an electronic card 14, a motor 15 driving the pump, connections 16, a plurality of winding 17 controlling the valves 12. This control is a housing of compact shape.

The electric motor 15 is provided in conventional manner with a rotor 19 and a stator and is of the type with an external collector 18 (which is to say located opposite the hydraulic unit 11). As a modification, this motor could also have a collector disposed between the hydraulic unit 11 and the control.

The motor according to the invention thus comprises a wound rotor 19, in rotation within an annular part called the stator. This stator carries, in a known manner, magnets 21 and has a ferromagnetic circuit 22 permitting closing the magnetic field of these magnets.

According to the invention, the ferromagnetic circuit 22 permits not only closing the lines of the field about the stator but also closing at least partially the lines of the magnetic field through the winding 17.

To this end, the ferrocircuit 22 of the stator surrounds the winding 17 forming an annular flange 23 at its external periphery.

Because of this, at least one portion of this ferrocircuit is provided by a same and single metallic frame common at least in part to the stator and to the winding. The annular flange 23 receives the winding 17 and the associated valves 12.

In FIGS. 1 and 2, a second annular metallic part 24 opposite said annular flange 23 completes the magnetic circuit surrounding each winding 17 to provide a U shaped magnetic circuit, enclosing optimally the lines of force about the winding. In this case, this second annular metallic part 24 can if desired be mounted with the annular flange 23 or being pre-mounted on the hydraulic block. In this latter case, the annular part 24 permits holding the valves in the hydraulic block by covering their shoulder. Because of this, it is possible no longer to place the valves in the hydraulic block, these latter are thus retained in place by the part 24 which also permits positioning them correctly. This part 24 thus has a double function. On the one hand, it serves to enclose correctly the field lines about the winding, and on the other hand it permits the positioning and holding of these winding (valves) in the hydraulic block.

Figure 3A:
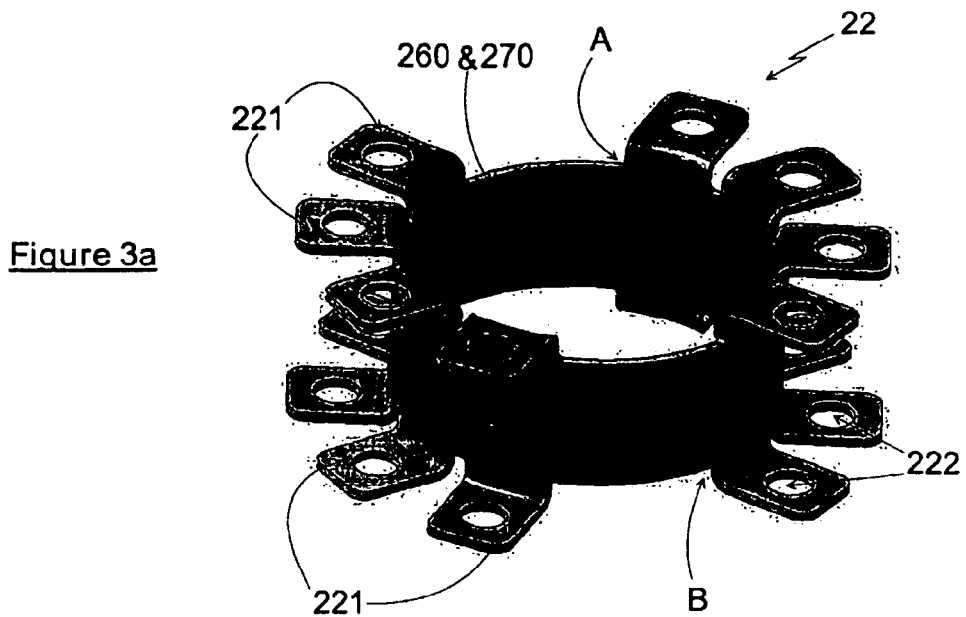
FIGS. 3a to 3c are schematic views showing a modified embodiment of the ferrocircuit according to the invention, FIG. 3c being a cross-section on the line III-III of FIG. 3b.
Figure 3B:
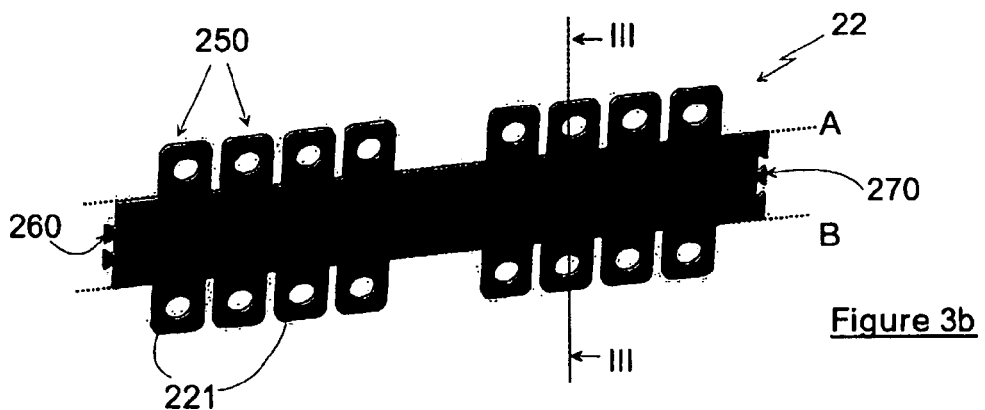
Figure 3C:
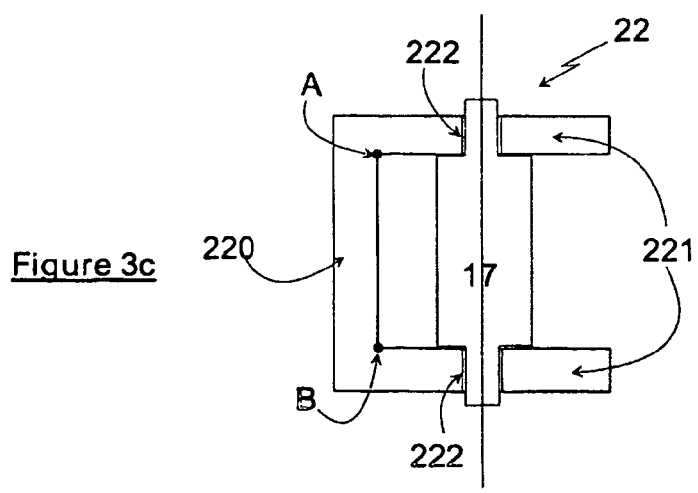

It will be noted however that as a modification it is possible to provide a so-called monolithic ferrocircuit, in a single piece, of U shape, enclosing the lines of force. Such a ferrocircuit is shown by way of modification in FIGS. 3a to 3c. As will be seen best from FIG. 3c, the ferrocircuit 22 has a central branch 220 and two end branches 221. Each of these end branches 221 is provided with an opening 222 adapted to receive one end of the winding 17 (shown in broken lines by way of example). Such a ferrocircuit has the advantage of being able to be produced from a stamped steel sheet according to the shape shown in FIG. 3b. There is thus provided a plurality of elements 250 (interconnected) which once bent along the bend lines A and B will take a U shape such as shown in FIG. 3c. The ferrocircuit according to this modified embodiment thus has the advantage of being able to be produced from a flat blank. As shown in FIG. 3b, the blank can be bent on itself and held in position by interlocking of the plates 260 and 270. Once closed on itself, the ferrocircuit according to this modified form of the invention, has the shape shown in FIG. 3a. Of course, the form and spacing of each element 250 can be different from those shown, without thereby departing from the scope of the present invention.

The ferrocircuit 22 performs simultaneously a function of mechanically holding the winding and a function of magnetic conduction for these same winding. This same ferrocircuit 22 of course performs a function of magnetic conduction for the stator.

Surprisingly, it has been observed that there is little or no magnetic diaphony between the motor 15 and the winding 17. More exactly, the magnetic diaphony between these two members is insufficient to disturb their respective functioning. It has also been observed that this diaphony no longer exists between the winding because they function simultaneously.

Preferably, the ferrocircuit according to the invention, being made of a single metallic piece, can be provided with suitable joints 26 to ensure sealing between the hydraulic unit and the control. This ferrocircuit also permits confining any possible loss of lubricant from the pump in a retention region 27 between the hydraulic block 11 and the control 13.

The provision of a ferrocircuit common at least in part to the stator and to the winding, permits substantially decreasing at least the axial dimensions of the electro-hydraulic unit, because it is thus possible to have the electrovalves (valve+winding+ferrocircuit) at the periphery of the motor and not to interpose the electrovalves between the motor and the hydraulic unit. Moreover, this ferrocircuit is an element independent of the hydraulic unit, which does not require, according to the invention, any modification.

The operation of the electro-hydraulic unit according to the invention is explained below.

This electrovalve is constituted by a winding 17 through which is engaged a valve 12 (cartridge containing a valve—not shown) whose movement is controlled by the winding. Thus, upon command by the electronic control 13, the valve is actuated and the hydraulic pressure prevailing in the hydraulic circuit (not shown) is modified. This electrovalve thus permits regulating the pressure in a hydraulic circuit with which it is associated. In general, there is at least one hydraulic circuit per vehicle wheel so as to be able to regulate, wheel by wheel, the braking pressure (when this electro-hydraulic unit is employed in a wheel and a locking device).

It is to be noted that one of the advantages arising from the so-called external position of the collector is, among other things, the possibility of being able to support the brushes 25 of the motor 15 via the housing 20 or the electronic card 14 (in the illustrated example) and not to create a plastic part to ensure this function as is at present the case in all the wheel anti-locking electro-hydraulic units known until now. Thus, in the prior art, the motor is an element separate from the hydraulic unit and from the control (electro-hydraulic unit in three parts). Another advantage of this reverse collector is that it enormously simplifies the connection 16 of the motor because the brushes 25 of the motor are nearer the electronic card 14, whilst according to the prior art the motor connection has to be pass through all the space of the hydraulic unit to be connected to the electronic card (electro-hydraulic unit in three parts).

If the arrangement of the electrovalves at the periphery of the motor permits substantially decreasing the dimensions of the electro-hydraulic unit, it is however possible to arrange these electrovalves between the motor and the hydraulic block without departing from the scope of the present invention. In this case, the form of the ferrocircuit 22 is different from that shown but there is still a first part forming a stator and a second part (in continuity with the first) enclosing at least partially the winding.

It will however be noted that when the electrovalves are disposed at the periphery of the motor, it is possible to have them in greater number than when they are placed below the motor. Because of this, when the electro-hydraulic unit is associated with an anti-locking and/or anti-skid device for the wheels and/or with a device for controlling the stability of the vehicle, the arrangement of the electrovalves at the periphery of the motor is preferable because it permits more easily housing the eight to twelve necessary electrovalves.

Of course the present invention is not limited to the embodiment described above. Thus, the use of a ferrocircuit common at least in part to the stator and to the winding can be used in all types of motor (with external collector, internal collector . . . ).

The invention claimed is:

1. Electro-hydraulic unit (10) in particular for an anti-locking device for wheels of an automotive vehicle, said electro-hydraulic unit being of the type comprising two separate parts:
    an electronic control (13) within which is located particularly an electronic card (14), winding (17) as well as an electric motor (15) provided with a rotor and a stator, said motor being adapted to drive a pump, and
    a hydraulic unit (11), comprising the pump and a plurality of valves (12), the whole electronically directed by the control (13),
said electro-hydraulic unit comprising moreover:
    a ferromagnetic circuit (22) common at least partially to the stator and to the winding (17),
said unit being characterized in that the ferrocircuit (22) is a separate element from the hydraulic unit and has at its periphery an annular flange (23) housing the winding (17), said annular flange ensuring simultaneously a function of mechanical holding of the winding (17) and a function of magnetic conduction for these winding.

2. Electro-hydraulic unit according to claim 1, characterized in that the ferrocircuit (22) is made in part from a metallic plate forming a stator and having an annular flange (23) at its external periphery.

3. Electro-hydraulic unit according to claim 1, characterized in that it comprises a motor (15) with an external collector (18), permitting decreasing the length of the electrical connections (16) between the brush carrier (25) and the electronic card (14).

4. Electro-hydraulic unit according to claim 3 characterized in that the electronic card (14) or the housing supports the brush carriers (25).

5. Electro-hydraulic unit according to claim 1, characterized in that it is the ferrocircuit (22) which ensures the sealing between the hydraulic unit (11) and the control (13) and permits confining possible leakages of lubricant.

6. Electro-hydraulic unit according to claim 2, characterized in that it comprises a motor (15) with an external collector (18), permitting decreasing the length of the electrical connections (16) between the brush carrier (25) and the electronic card (14).

* * * * *